(12) United States Patent
Petzold et al.

(10) Patent No.: US 6,701,248 B2
(45) Date of Patent: Mar. 2, 2004

(54) METHOD OF ROUTE PLANNING IN A NAVIGATION SYSTEM

(75) Inventors: Bernd Petzold, Wunstorf (DE); Cornelius Hahlweg, Hildesheim (DE); Gerd Draeger, Braunschweig (DE); Ulrich Kersken, Diekholzen (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 10/203,748

(22) PCT Filed: Jan. 19, 2001

(86) PCT No.: PCT/DE01/00211

§ 371 (c)(1), (2), (4) Date: Oct. 28, 2002

(87) PCT Pub. No.: WO01/59408

PCT Pub. Date: Aug. 16, 2001

(65) Prior Publication Data

US 2003/0093217 A1 May 15, 2003

(30) Foreign Application Priority Data

Feb. 10, 2000 (DE) .......................................... 100 05 780

(51) Int. Cl.⁷ ................................................ G01C 21/00
(52) U.S. Cl. ........................ 701/202; 701/26; 701/211
(58) Field of Search ................................ 701/200, 201, 701/202, 205, 209, 210, 211, 23, 25, 26; 340/990, 995.21

(56) References Cited

U.S. PATENT DOCUMENTS

| 5,905,451 A | 5/1999 | Sakashita |
| 6,266,613 B1 * | 7/2001 | Nimura et al. ............... 701/210 |
| 6,321,162 B1 * | 11/2001 | Hessing ....................... 701/210 |

FOREIGN PATENT DOCUMENTS

| EP | 0 967 460 | 12/1999 |
| WO | WO 92 08952 | 5/1992 |
| WO | WO 93 09511 | 5/1993 |

* cited by examiner

Primary Examiner—Yonel Beaulieu
(74) Attorney, Agent, or Firm—Kenyon & Kenyon

(57) ABSTRACT

A method of route planning in a navigation system, takes place in three steps. In a first step, a quantity of first travel routes is determined on the basis of an optimization criterion, and location-independent and situation-specific user preferences derived therefrom. In the second step, the first travel routes are recalculated in sub-segments on the basis of location-dependent and situation-specific user preferences. In the third step, the determined travel routes are prioritized on the basis of at least one rating criterion. The intermediate results obtained may be displayed for the user after each step, so that the user may select one of the routes if necessary and thus end the method early. The operating behavior of the user and/or the way in which the user follows the route recommendations may be monitored and statistically evaluated, making it possible to customize the rating criteria and user preferences for route planning.

6 Claims, 3 Drawing Sheets

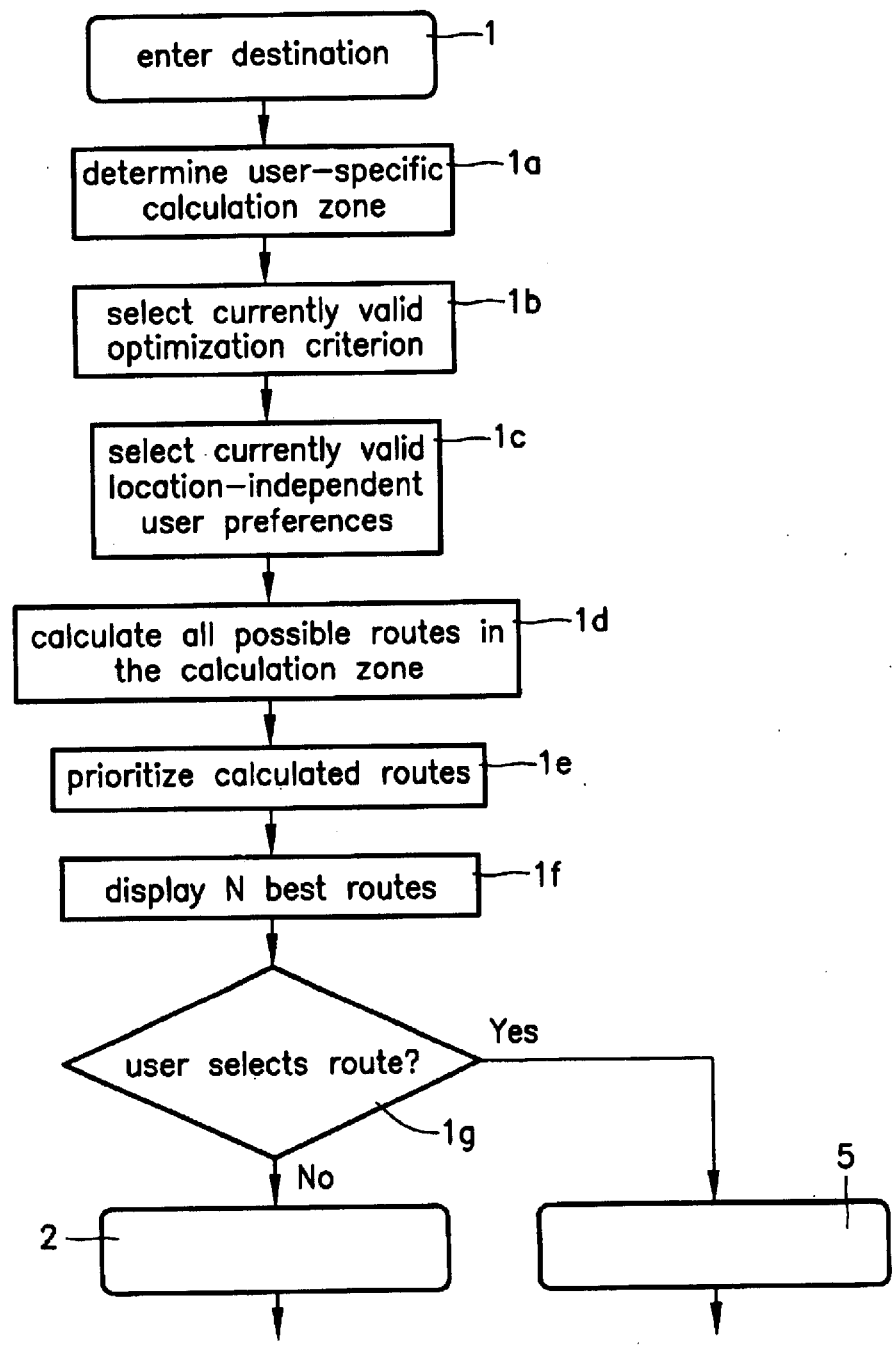

METHOD OF ROUTE PLANNING IN A NAVIGATION SYSTEM

FIELD OF THE INVENTION

The present invention relates to a method of route planning in a navigation system in which the user makes basic settings for the route to be planned, and the route is defined on the basis of optimization criteria. The present invention also relates to a navigation system that is suitable for carrying out the method.

BACKGROUND INFORMATION

Conventional navigation systems for assisting a road user, in particular the driver of a car generally include the following subsystems: a) digital road map, b) computing module for calculating a travel route, c) position locating unit, d) system management unit, e) sensors for detecting vehicle movements, f) input unit, and g) output unit for operation and navigation. Generally, the route is calculated on the basis of different optimization parameters that must either be set in advance by the user or are already permanently incorporated into the algorithms at the factory for the purpose of calculating the route. Optimization takes place by rating the relevant route segment elements contained in a database, which may include, for example, length, possible speed, type of road, and the like. The optimum route can be selected, for example, by compiling the fastest or the shortest route. The user's personal preferences may influence the way in which these items are weighted.

The optimization preset at the factory is usually parameterized for an "average driver" and therefore provides an optimum route only for such a driver. However, not all drivers feel the same way about the route recommendation. For example, they may prefer or avoid certain road types, or the average speed on the highway may vary depending on the vehicle type, driver temperament, or the like. At present, these individual driving patterns and other route selection preferences (for example, a preference for scenic routes) are, at best, usually included by manual entry of preset parameters, which can usually be done only when the vehicle is stationary. This makes the navigation system more complex and less user-friendly, particularly as the number of parameters increases, so that only experienced or technically adept users may be expected to be able to reasonably customize all relevant parameters.

SUMMARY

An object of the present invention is to improve a navigation system of the type mentioned in the preamble in a way that makes route planning more comprehensible to the user and enables the user to easily influence route planning.

A method of route planning in a navigation system is provided. The user makes basic settings for the route to be planned (starting point, destination, time settings, etc.), and the route is defined on the basis of optimization criteria (shortest route, fastest time, etc.). In a first step, a quantity of first travel routes is determined on the basis of location-independent and situation-specific user preferences. If necessary, this quantity may also include only a single suggested travel route. In a second step, the travel routes determined in the first step are recalculated in sub-segments on the basis of location-dependent and situation-specific user preferences. During this phase, for example, a decision may be made on whether to locally select a route through town or a route by-passing town. Finally, in a third step, the determined travel routes are prioritized on the basis of at least one rating criterion so that they may be suggested to the user in a scaled order.

The hierarchical prioritization according to the example embodiment of the present invention, i.e., scaled inclusion of optimization criteria in route planning, yields a planning process whose execution remains comprehensible even to nontechnically adept users. This therefore enables users to more easily identify and, if necessary, correct undesired planning choices.

The optimization criterion applied in the first step may be preset by the user at the beginning of the planning procedure. This makes it possible to take into account a currently valid primary optimization criterion, for example a preference for the most scenic route, so that the completed route planning will better meet the user's current objective. In addition, specifying the primary optimization criterion makes the route recommendation as a whole easy to understand. The optimization criterion preset by the user may be parameterized on the basis of preset location-independent and situation-specific user preferences. This means that the optimization criterion serves as a guideline on the basis of which the user preferences to be considered are selected. The parameters of the optimization criterion are presettable at the factory, by the user, and/or by other systems outside the navigation system. The optimization criterion entered by the user may also be used to prioritize the route recommendations made in the various steps of the method.

The parameters in the first step may be related to the route, segment, and/or sub-segment. They may be advantageously derived from at least one route segment characteristic and/or the environmental characteristics of route segments (for example, nature reserves, developed areas) or assigned objects (for example, tourist sights or certain kinds of stores).

To the extent that the parameters are preset for carrying out the first step of the method, user-specific and situation-related deviations may be automatically determined and then made available to external devices for statistical evaluation of user behavior. The traffic route network on which the route calculation is based may be limited on the basis of typical user behavior and/or the distance or traveling time between the starting point and destination.

The user preferences for the route selection, on which the second step of the method is based, may be presettable by the user or by an external system. The user preferences to be considered are selectable according to situation and independently of the first step. In particular, they may be independent of the primary optimization criterion that may have been used as a basis in the first step. In the case of the primary optimization criterion "shortest route", this makes it possible, for example, to locally select a circumventing, and thus longer, route by-passing a town if the user would rather not drive through major cities during rush hour.

In the third step of the method according to the present invention, the travel routes determined in the first and second steps are prioritized on the basis of at least one rating criterion. The number of suggested travel routes may also be restricted by a preset limit for the respective rating criterion.

The rating criterion used in the third step may include at least one of the parameters: travel time or route length. These criteria may be important, so they are typically not ignored when planning a route.

The rating criterion may also include the parameters "maximum travel time" and/or "maximum route distance."

This means that travel routes which exceed the values of the specified parameters are either not displayed or are at least assigned a very negative rating. The values for the parameters "maximum travel time" and/or "maximum route distance" may be determinable on the basis of preset situation-dependent user preferences or those determined automatically by external devices. In particular, these parameters may be derived from the destination, purpose of the trip, and/or travel route.

In an example embodiment of the present invention, the user may select, after each of the three completed sub-steps, one of the travel routes determined therein. The determined travel routes may be visually and/or acoustically presented to the user along with their respective rating after each of the steps. This enables the user to track and immediately understand the progress of route planning, since different criteria for selecting the routes are applied in sequence. The optimization procedure thus remains transparent to the user. In addition, the procedure may be customized to the user, since at any time he may select a partial result that best meets his needs and use it as a basis for navigation.

The selected travel routes according to the respective method steps are displayable in graphic form on a digital map. It is also possible to present the text in acoustic and visual form on the basis of prominent features. For example, a description may be provided by listing known towns along the travel-route.

In a refinement of the method according to the present invention, the optimization criteria and rating criteria used in the method steps are configurable via preset user-specific and situation-related behavior statistics. This means that the driver's behavior when interacting with the route planning facility, as well as his subsequent driving patterns and any deviations from the route recommendations, are monitored, recorded, and then statistically evaluated. Significant patterns in the user's behavior may then be used to select rating criteria that are tailored optimally to the user or to generate completely new ones. Thus, the operating procedure and deviations from the route followed may be supplied, for example, to external devices for recording and adapting user preferences. In this manner, a navigation system that has been parameterized for an average driver at the factory is automatically customizable to the user's needs.

The example method according to the present invention is usable in vehicle navigation systems, portable navigation systems, or centrally based navigation systems. One advantage of the example method is that, compared to the fixed establishment of user profiles and user preferences, the complexity of settings and parameter sets is not visible from the outside and thus does not have a disturbing or inhibiting effect on the user. In addition, the communications links to data centers or mobile data media may be used to preset default ratings for the traffic route network (for example, scenic, historical, or tourist routes) on the basis of which a route may be calculated and, when used multiple times, customized to the user's individual behavior (for example, route segments that the user finds scenic). The ratings in the second and third steps of the method make it possible to consider preferences that are currently of lower priority to the user. For example, it is possible to select a scenic route that does not exceed a preset travel time. User intervention in the route planning, for example the early selection of a route in an intermediate step, is advantageously usable to better customize the system to the user's behavior. Likewise, the abstract understanding of the optimization criterion selectable in the first step is adjustable to the user's own understanding, thereby achieving high user acceptance.

BRIEF DESCRIPTION OF THE DRAWINGS

FIG. 2 shows a schematic representation of a modified overall navigation system according to the present invention.

FIG. 3 shows a flow chart of a first part of the route planning method.

DETAILED DESCRIPTION

Figure 1:
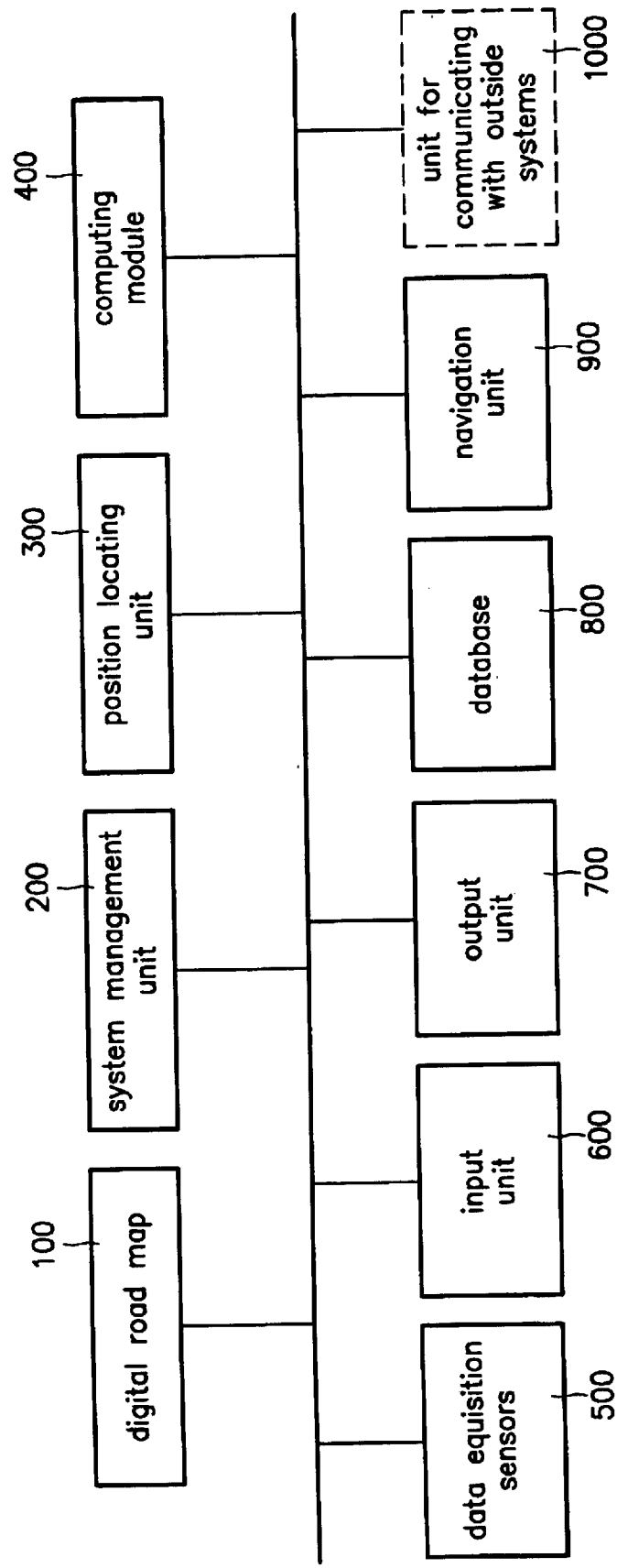
FIG. 1 shows a schematic representation of the components of a navigation system.

FIG. 1 shows a schematic representation of the components of a navigation system. The navigation system includes the subsystems digital road map 100, computing module for determining a travel route 400, position locating unit 300, system management unit 200, controllable data acquisition sensors 500, input unit 600, output unit 700, and navigation unit 900. An optional unit 1000 for communicating with other systems outside the navigation system may also be provided.

According to the present invention, a dynamizable database 800 for optimization criteria is to be added to this navigation system for the purpose of user-adaptive route planning. User- and situation-specific configuration parameters are stored in database 800 for the route calculation and for the navigation database. Database 800 is also optionally expandable to allow automatic preparation of user presets and selection of the currently valid parameter settings.

FIG. 2 shows an overall system in which at least parts of database 800 are provided autonomously in mobile subsystem 2000, or in mobile or stationary subsystem 3000, systems 2000 and 3000 being connected via a communication unit 1000.

Figure 4:
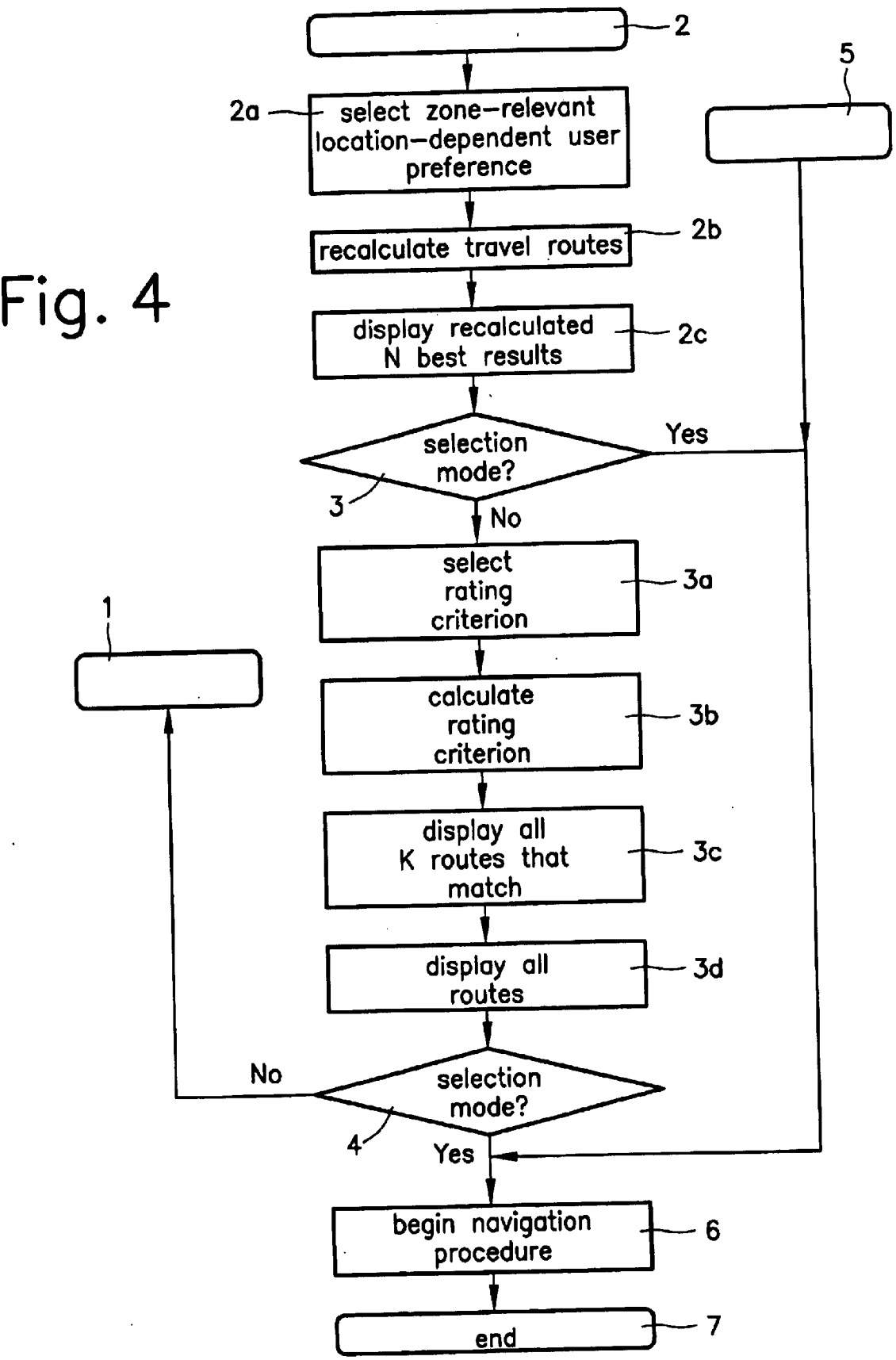
FIG. 4 shows a flow chart of the second part of the route planning method.

The user-adaptive route planning method is described below on the basis of FIGS. 3 and 4.

The method is initialized in step 1 in which a destination is entered by the user or by other units (including those outside the system).

A user-specific calculation zone in the traffic route network, including at least the current position and the destination, is determined in step 1a. The currently valid optimization criterion, for example "scenic route," "low-traffic route," or the like, is selected in step 1b.

The currently valid location-independent user preferences are selected in step 1c as a function of the optimization criterion selected in step 1b. These preferences may be rules, for example, "avoid country roads in foggy regions." These criteria are used to re-evaluate the traffic route network in the calculation zone from step 1a.

All possible routes in the calculation zone from step 1a are calculated in step 1d. The calculated routes are prioritized according to the best match with the optimization criterion in subsequent step 1e.

The N best routes are displayed on output unit 700 in step 1f, where N may be a number that is presettable by the user or the system. This ends first step a) of the method according to the present invention.

In step 1g, the user is already able to select one of the suggested routes. In this case, the method would branch to step 5, resulting in step 6. If no selection is made, the method continues with step 2 (FIG. 4).

In step 2a, the zone-relevant, location-dependent user preferences are selected in the calculation zone from step 1a, with subsequent local re-evaluation of the network. The travel routes are then recalculated locally in step 2*b*, using the respective user preferences that are independent of the optimization criterion in step 1*a*. They may be, for example, rules such as "find the quickest detour to avoid driving through town."

The recalculated N best routes are displayed in step 2*c*. This ends step 2 *b*) of the method according to the present invention.

In step 3, the user may make an early selection of one of the suggested routes. If a selection of this type is made, the system branches to step 6. Otherwise it continues with step 3*a*.

In step 3*a*, a rating criterion selectable by the user, if desired (for example, the quickest time or shortest route), is selected and the N best routes are rated according to this rating criterion. The above-mentioned rating criterion is calculated in subsequent step 3*b* by presetting a user-specific limit S (for example, "S=travel time<2$h$").

All K routes that match above-mentioned limit S are displayed in step 3*c*. A rating of the routes from steps 1 and 3 is also displayed in the form of a comparison. This may have the following appearance, for example:

"Most scenic routes under two hours:

1-best =route 1 with travel time=1:50 h 2-best =route 5 with travel time=1:20 h

. . ."

If no K routes matching limit S are available, or if the user would like to view all calculated routes in the calculation zone instead, all routes are displayed in step 3*d*.

The user may then select a route in step 4, after which the system branches to step 6. If no selection is made, the entire procedure may be restarted by returning to step 1, or it may be aborted.

The navigation procedure begins in step 6, and its completion ends the method in step 7. If significant changes in the route segment properties occur during navigation in step 6 (for example, traffic disturbances), the travel route is recalculated locally, taking into account the applicable preferences.

What is claimed is:

1. A method of route planning in a navigation system in which a user makes basic settings for a route to be planned, and the route is defined on the basis of optimization criteria, the method comprising:

a) determining a quantity of first travel routes based on location-independent and situation-specific user preferences;

b) recalculating the first travel routes in sub-segments based on location-dependent and situation-specific user preferences;

c) prioritizing the first travel routes based on at least one rating criterion;

enabling the user to select one of the first travel routes after each of steps a), b) and c); and presenting the first travel routes at least one of visually and acoustically to the user along with a respective rating after each of steps a), b) or c).

2. The method according to claim 1, further comprising:

deriving the location-independent and situation-specific user preferences from at least one of a route segment characteristic and an environmental characteristic of the route segments.

3. The method according to claim 1, further comprising:

presetting the location-independent and situation-specific user preference, and the location-dependent and situation specific user preferences by the user or by an external system.

4. The method according to claim 1, wherein the at least one rating criterion includes at least one of travel time or route length.

5. The method according to claim 1, wherein the at least one rating criterion is configured via user-specific and situation-related behavior statistics.

6. A navigation system, comprising:

an output unit; and a route planner configured to perform a route planning method, the method including:

a) determining a quantity of first travel routes based on location-independent and situation-specific user preferences;

b) recalculating the first travel routes in sub-segments based on location-dependent and situation-specific user preferences;

c) prioritizing the first travel routes based on at least one rating criterion;

enabling the user to select one of the first travel routes after each of steps a), b) and c); and presenting the first travel routes at least one of visually and acoustically to the user along with a respective rating after each of steps a), b) or c).

* * * * *